(12) United States Patent
Kong et al.

(10) Patent No.: US 11,196,134 B2
(45) Date of Patent: Dec. 7, 2021

(54) PHASE SHIFTER INCLUDING A DIELECTRIC LAYER HAVING LIQUID CRYSTAL MOLECULES CONFIGURED TO BE ROTATED SO AS TO CAUSE PHASE SHIFT

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Xiangzhong Kong, Beijing (CN); Tienlun Ting, Beijing (CN); Lei Wang, Beijing (CN); Ken Wen, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/639,679

(22) PCT Filed: May 20, 2019

(86) PCT No.: PCT/CN2019/087612
§ 371 (c)(1),
(2) Date: Feb. 17, 2020

(87) PCT Pub. No.: WO2019/223647
PCT Pub. Date: Nov. 28, 2019

(65) Prior Publication Data
US 2020/0266511 A1    Aug. 20, 2020

(30) Foreign Application Priority Data

May 21, 2018   (CN) .......................... 201810489325.9
Aug. 9, 2018   (CN) .......................... 201810901709.7

(51) Int. Cl.
*H01P 1/18*     (2006.01)
*H01Q 3/34*    (2006.01)

(52) U.S. Cl.
CPC ................ *H01P 1/184* (2013.01); *H01P 1/18* (2013.01); *H01Q 3/34* (2013.01)

(58) Field of Classification Search
CPC .. H01P 1/18; H01P 1/181; H01P 1/184; H01P 9/00; H01Q 3/34; H01Q 3/36
(Continued)

(56) References Cited

U.S. PATENT DOCUMENTS

2008/0048800 A1   2/2008   Dutta
2014/0022029 A1   1/2014   Glushchenko et al.
(Continued)

FOREIGN PATENT DOCUMENTS

CN   106025452 A   10/2016
CN   107994302 A   5/2018
CN   208655852 U   3/2019

*Primary Examiner* — Benny T Lee
(74) *Attorney, Agent, or Firm* — Nath, Goldberg & Meyer; Joshua B. Goldberg (57) ABSTRACT

A phase shifter and a method for operating the same, an antenna and a communication device are provided. The phase shifter includes: a first substrate and a second substrate opposite to each other; a dielectric layer between the first substrate and the second substrate; a first electrode on a side of the first substrate proximal to the second substrate; a second electrode on a side of the second substrate proximal to the first substrate; and a ground electrode on a side of the second substrate distal to the first substrate. The dielectric layer includes liquid crystal molecules, and the first electrode and the second electrode are configured to control rotation of the liquid crystal molecules according to different voltages respectively received by the first electrode and the second electrode.

20 Claims, 4 Drawing Sheets

(58) Field of Classification Search
USPC .................................................. 333/156, 161
See application file for complete search history.

(56) References Cited

U.S. PATENT DOCUMENTS

2015/0380789 A1* 12/2015 Jakoby et al. .......... H01P 1/184
　　　　　　　　　　　　　　　　　　　　　　　343/905
2016/0358750 A1　12/2016　Ikeda et al.

* cited by examiner

PHASE SHIFTER INCLUDING A DIELECTRIC LAYER HAVING LIQUID CRYSTAL MOLECULES CONFIGURED TO BE ROTATED SO AS TO CAUSE PHASE SHIFT

CROSS-REFERENCE TO RELATED APPLICATIONS

This is a National Phase Application filed under 35 U.S.C. 371 as a national stage of PCT/CN2019/087612, filed on May 20, 2019, an application claiming priority to Chinese patent application No. 201810489325.9, filed on May 21, 2018 and Chinese patent application No. 201810901709.7 filed on Aug. 9, 2018, the entire contents of each of which are incorporated herein by reference.

TECHNICAL FIELD

An embodiment of the present disclosure relates to the technical field of a phase shifter, and in particular, to a phase shifter and a method for operating the same, an antenna and a communication device.

BACKGROUND

A phase shifter is a device capable of adjusting a phase of a microwave. The phase shifter is widely applied to electronic communication systems, and is a core component in systems such as a phased array radar, a synthetic aperture radar, a radar electronic countermeasure system, a satellite communication system, a transceiver, and the like. High performance phase shifters therefore play a crucial role in these systems.

SUMMARY OF THE INVENTION

Embodiments of the present disclosure provide a phase shifter and a method for operating the same, an antenna and a communication device.

In a first aspect, a phase shifter is provided in an embodiment of the present disclosure, including: a first substrate and a second substrate opposite to each other; a dielectric layer between the first substrate and the second substrate; a first electrode on a side of the first substrate proximal to the second substrate; a second electrode on a side of the second substrate proximal to the first substrate; and a ground electrode on a side of the second substrate distal to the first substrate; wherein the dielectric layer includes liquid crystal molecules, and the first electrode and the second electrode are configured to control rotation of the liquid crystal molecules according to different voltages respectively received by the first electrode and the second electrode.

In an embodiment, the first electrode includes a plurality of metal patches arranged periodically.

In an embodiment, the second electrode is a microstrip.

In an embodiment, a respective longitudinal axis direction of the microstrip is the same as a direction in which the plurality of metal patches are arranged.

In an embodiment, each of the plurality of metal patches has a width of 0.5 millimeters to 1.5 millimeters.

In an embodiment, a respective length of each of the plurality of metal patches is less than or equal to 5 times of a width of the microstrip.

In an embodiment, a period of the first electrode is less than or equal to 3 millimeters.

In an embodiment, the liquid crystal molecules are nematic liquid crystal molecules.

In an embodiment, an angle between a respective longitudinal axis direction of each of the nematic liquid crystal molecules and a plane where the second electrode is located is greater than 0 degree and less than 90 degrees.

In an embodiment, the nematic liquid crystal molecules are positive nematic liquid crystal molecules, and an angle between a respective longitudinal axis direction of each of the positive nematic liquid crystal molecules and the plane where the second electrode is located is greater than 0 degree and less than or equal to 45 degrees.

In an embodiment, the nematic liquid crystal molecules are negative nematic liquid crystal molecules, and an angle between a respective longitudinal axis direction of each of the negative nematic liquid crystal molecules and the plane where the second electrode is located is greater than 45 degrees and less than 90 degrees.

In an embodiment, a dielectric constant of each of the liquid crystal molecules in a respective longitudinal axis direction of the liquid crystal molecule is larger than a dielectric constant of the first substrate or the second substrate.

In an embodiment, a material of the first electrode includes aluminum, silver, gold, chromium, molybdenum, nickel, or iron.

In an embodiment, a material of the second electrode includes aluminum, silver, gold, chromium, molybdenum, nickel, iron, or transparent conductive oxide.

In an embodiment, a material of any one of the first substrate and the second substrate includes glass, sapphire, polyethylene terephthalate, triallyl cyanurate, polyimide, or ceramic.

In an embodiment, the dielectric layer has a thickness of 5 microns to 10 microns.

In an embodiment, the ground electrode is grounded and has a sheet shape.

In a second aspect, a method for operating the phase shifter according to any one of the above embodiments of the present disclosure is provided, wherein the method includes: applying different voltages to the first electrode and the second electrode, respectively, to generate an electric field between the first electrode and the second electrode, so as to cause a respective longitudinal axis of the liquid crystal molecules to be substantially parallel to a direction of the electric field.

In a third aspect, an antenna is provided, including at least one phase shifter according to any one of the above embodiments of the present disclosure.

In a fourth aspect, a communication device is provided, including the antenna of the above embodiments of the present disclosure.

Additional features and advantages of the present disclosure will be set forth below in the specification, and will at least partly be obvious from the specification, or may be apparent by practicing the embodiments of the present disclosure. The objectives and other advantages of the present disclosure may be realized and obtained by the structure and/or steps particularly pointed out in the specification and claims as well as the accompanying drawings.

BRIEF DESCRIPTION OF THE DRAWINGS

Drawings are intended to provide a further understanding of the disclosed technical solutions and constitute a part of this specification. The drawings together with exemplary

DETAILED DESCRIPTION OF THE INVENTION

In order to make objects, technical solutions and advantages of the present disclosure more apparent, embodiments of the present disclosure will be described in detail below with reference to the drawings. It should be noted that, in the present disclosure, embodiments and features of the embodiments may be arbitrarily combined with each other in a case where there is no explicit conflict.

The steps illustrated in the flow charts of the drawings may be performed in for example a computer system including a set of computer executable instructions. Further, while a logical order is shown in the flow charts, the steps shown or described may be performed in an order different from those shown in some cases.

Unless otherwise defined, technical or scientific terms used herein (including in the specification and claims) shall have the ordinary meaning as understood by one of ordinary skill in the art to which the present disclosure belongs. The words of "first", "second", and the like used in the present disclosure is not intended to indicate any order, quantity, or importance, but rather is used for distinguishing between different elements. The words of "comprise" or "include", and the like, means that the element or item preceding the word contains the element or item listed after the word and its equivalents, but does not exclude the presence of other elements or items. The terms of "connected", "coupled" and the like are not limited to physical or mechanical connections, but may include electrical connections and the like, whether directly or indirectly. The terms of "upper", "lower", "left", "right", and the like are used merely for indicating relative positional relationships, and when an absolute position of the object described is changed, the relative positional relationships may also be changed accordingly.

The inventors of the present disclosure have found that most of the phase shifters currently available on the market are ferrite phase shifters and PIN (Positive-Intrinsic-Negative) diode phase shifters. The ferrite phase shifters have disadvantages of large size and slow response speed, and are not suitable for high-speed beam scanning. The PIN diode phase shifters have high power consumption, and are not favorable for being used in for example a phased array system with portability and low power consumption. In addition, existing phase shifters have disadvantages such as large loss, and may not meet the requirement of rapid development of electronic equipment and/or electronic systems.

A phase shifter and a method for operating the same, an antenna and a communication device are provided by embodiments of the present disclosure, to at least solve the technical problems of high power consumption, slow response speed and large volume of the existing phase shifters.

Figure 1:
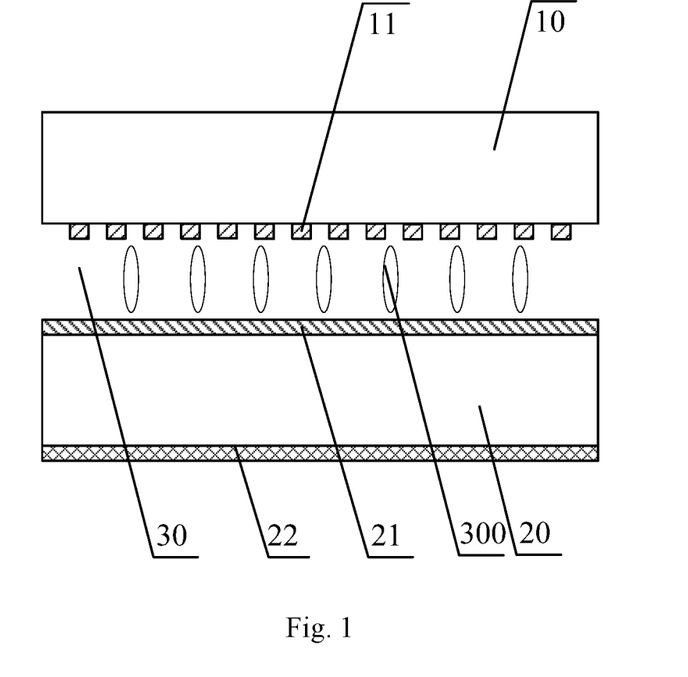
FIG. 1 is a schematic diagram of a structure of a phase shifter according to an embodiment of the present disclosure.

FIG. 1 is a schematic diagram of a structure of a phase shifter according to an embodiment of the present disclosure. As shown in FIG. 1, the phase shifter provided by the present embodiment of the present disclosure may include: a first substrate 10; a second substrate 20 opposite to the first substrate 10; a dielectric layer 30 between the first substrate 10 and the second substrate 20; a first electrode 11 on a side of the first substrate 10 proximal to the second substrate 20; a second electrode 21 on a side of the second substrate 20 proximal to the first substrate 10; and a ground electrode 22 on a side of the second substrate 20 distal to the first substrate 10.

In the present embodiment, the dielectric layer 30 may include a plurality of liquid crystal molecules 300. The first electrode 11 and the second electrode 21 may control the rotation of the liquid crystal molecules 300 according to received different voltages (or voltage signals). It should be noted that there is capacitance between the first electrode 11 and the second electrode 21, and thus the first electrode 11 and the second electrode 21 may correspond to two plates of a plate capacitor, respectively. The dielectric layer 30 between the first electrode 11 and the second electrode 21 corresponds to the dielectric of the plate capacitor. In the presence of an electric field between the first electrode 11 and the second electrode 21, a dielectric constant of the dielectric layer 30 may vary, i.e., the capacitance of the plate capacitor may vary, thereby changing a phase of a waveform transmitted through the phase shifter.

In an embodiment, a glass substrate or a sapphire substrate having a thickness of 100 microns to 1000 microns, or a transparent flexible substrate having a thickness of 10 microns to 500 microns such as a polyethylene terephthalate substrate, a triallyl cyanurate substrate, or a polyimide substrate, may be used as each of the first substrate 10 and the second substrate 20. In addition, each of the first and second substrates 10 and 20 may be made of a ceramic material having an appropriate thickness.

In an embodiment, the first substrate 10 and the second substrate 20 are each made of high-purity quartz glass with extremely low dielectric loss. Compared with a general glass substrate, the first substrate 10 and the second substrate 20 made of high-purity quartz glass may effectively reduce the loss of microwaves, such that the phase shifter has low power consumption and a high signal-to-noise ratio. For example, the high-purity quartz glass may refer to a quartz glass in which the weight percentage of $SiO_2$ is 99.9% or more.

In an embodiment, the first electrode 11 may be made of metal such as aluminum, silver, gold, chromium, molybdenum, nickel, or iron.

In an embodiment, the second electrode 21 may be made of metal such as aluminum, silver, gold, chromium, molybdenum, nickel, or iron, and alternatively, the second electrode 21 may also be made of transparent conductive oxide.

In an embodiment, an angle between the respective longitudinal axis direction of each liquid crystal molecule 300 and a plane where the second electrode 21 is located may be greater than 0 degree and less than 90 degrees. The liquid crystal molecules 300 may be positive liquid crystal molecules or negative liquid crystal molecules. It should be noted that, when the liquid crystal molecules 300 are positive liquid crystal molecules, the angle between the respective longitudinal axis direction of each liquid crystal molecule 300 and the plane where the second electrode 21 is located may be greater than 0 degree and equal to or less than 45 degrees. When the liquid crystal molecules 300 are negative liquid crystal molecules, the angle between the respective longitudinal axis direction of each liquid crystal molecule 300 and the plane where the second electrode 21 is located may be greater than 45 degrees and less than 90 degrees. As such, after the liquid crystal molecules 300 are driven to rotate, a propagation constant of the microwaves may be better adjusted, such that a purpose of phase shifting of the microwaves is achieved.

In the embodiment, in order to better adjust the transmission parameters of the microwaves after the liquid crystal molecules 300 are driven to rotate, the dielectric constant of each liquid crystal molecule 300 in the respective longitudinal axis direction thereof may be greater than the dielectric constant of the first substrate 10 and/or greater than the dielectric constant of the second substrate 20. However, the present disclosure is not limited thereto. For example, a choice of liquid crystal material may be based on the requirement of a practical application and the cost for the material.

As described above, the phase shifter provided by the present embodiment of the present disclosure may include: the first substrate; the second substrate opposite to the first substrate; the dielectric layer between the first substrate and the second substrate; the first electrode on the side of the first substrate proximal to the second substrate; the second electrode on the side of the second substrate proximal to the first substrate; and the ground electrode on the side of the second substrate distal to the first substrate. The dielectric layer includes the liquid crystal molecules. The first electrode and the second electrode are configured to control the rotation of the liquid crystal molecules based on the different received voltages. In the present embodiment of the present disclosure, the liquid crystal molecules are provided between the first substrate and the second substrate, and the liquid crystal molecules are driven to rotate by a voltage difference between the first electrode and the second electrode. Since the effective dielectric constant around the microwave during transmission of the microwave is changed due to the rotation of liquid crystal molecules, the transmission parameters of the microwave may be changed, and phase shifting for the microwave is achieved. The solution provided by the present embodiment of the present disclosure reduces loss, a response time and a volume of the phase shifter, and improves performance of the phase shifter. In other words, the electric field formed by the voltage difference between the first electrode and the second electrode may drive the liquid crystal molecules to rotate, such that the dielectric constant of the dielectric layer is changed. Thus, a resonant frequency of the microwave passing through the dielectric layer is changed, and a phase speed of the microwave is changed, thereby realizing the phase shifting of the microwave. In addition, the ground electrode is provided on the side of the second substrate distal to the first substrate, and thus the second electrode and the ground electrode on the second substrate form a microwave transmission structure. In this case, the second substrate is a transmission channel of the microwave, which serves as a main transmission region for the microwave. The microwave is not absorbed substantially during transmission in the second substrate made of the above material such as glass, ceramic, or the like, and thus the loss of the microwave may be effectively reduced. For example, the energy loss of the microwave transmitted in the second substrate is smaller by one order of magnitude than that in a layer where the liquid crystal molecules are located.

Figure 2:
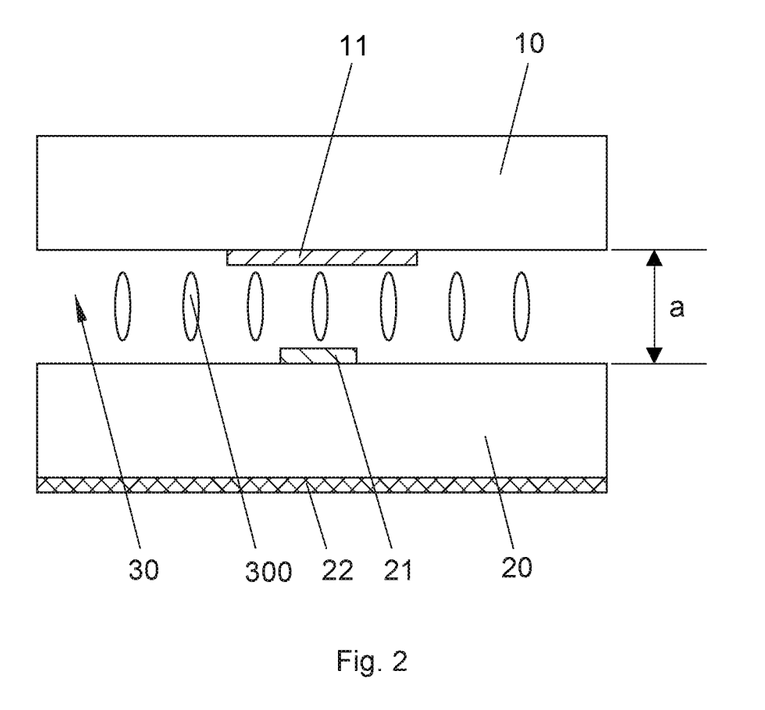
FIG. 2 is a side view of a phase shifter according to an embodiment of the present disclosure.
Figure 3:
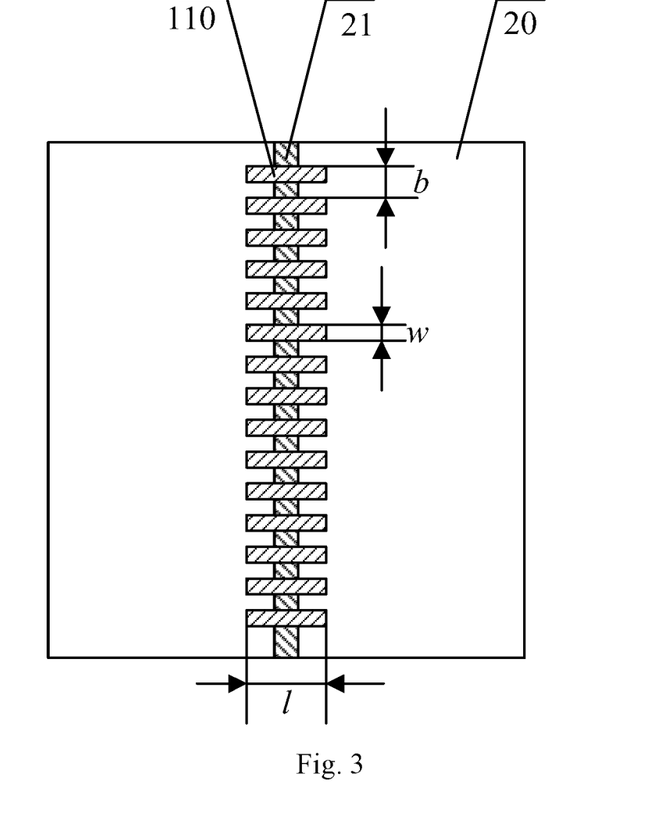
FIG. 3 is a top view of a phase shifter according to an embodiment of the present disclosure.

FIG. 2 is a side view (e.g., as viewed from the left or right side of FIG. 1) of a phase shifter in an embodiment of the present disclosure, and FIG. 3 is a top view of a phase shifter in an embodiment of the present disclosure (e.g., the first substrate 10 may be transparent, as described above; in a case that the first substrate 10 is opaque, FIG. 3 may be a top view after removing the first substrate 10). As shown in FIGS. 2 and 3, the first electrode 11 (FIG. 3) of the phase shifter provided by the present embodiment of the present disclosure may include a plurality of metal patches 110 (FIG. 3) arranged periodically on the first substrate, and the second electrode 21 may be a microstrip (which may also be referred to as a microstrip line). For example, the plurality of metal patches 110 may be arranged at a same interval (i.e., with a same interval therebetween). In this way, the ground electrode 22 (FIG. 2) and the microstrip (i.e., the second electrode 21) on the second substrate 20 form an output structure for the microwave, and the second substrate 20 may serve as a transmission channel of the microwave. For example, a direction in which the plurality of metal patches 110 are arranged and a respective longitudinal axis direction of the microstrip may be the same. With this configuration, not only the microstrip may transmit microwaves together with the ground electrode 22, but also the liquid crystal molecules 300 (FIG. 2) are driven to rotate by the electric field generated by applying different voltages to the microstrip and metal patches 110, such that the dielectric constant of the layer in which the liquid crystal molecules 300 are located is changed to change the resonance frequency of the microwaves. Thus, phases of the microwave are adjusted. The phase shifter is simple in structure and easy to realize.

In an embodiment, in order to increase an area (referred to as an "overlapping area") of an overlapping region between an orthographic projection (which may also be referred to as an orthogonal projection) of the first electrode 11 on the second substrate 20 and an orthographic projection (which may also be referred to as an orthogonal projection) of the second electrode 21 on the second substrate 20 so as to increase the capacitance between the first electrode 11 and the second electrode 21 and make a more remarkable effect of phase shifting, the respective longitudinal axis direction of the microstrip (e.g., a vertical direction in FIG. 3) may be the same as the direction (e.g., the vertical direction in FIG. 3) in which the plurality of metal patches 110 are arranged. It should be noted that the phase shifter provided by the present embodiment of the present disclosure as shown in FIG. 1 may be the phase shifter as shown in FIG. 1 viewed along a short axis direction (i.e., a horizontal direction in FIG. 3) of the second electrode 21; and FIG. 2 may be a side view viewed along the respective longitudinal axis direction (i.e., the vertical direction in FIG. 3) of the second electrode 21.

As described above, the second electrode 21 in the present embodiment of the present disclosure is multiplexed as the microstrip for transmitting microwaves in addition to driving the liquid crystal molecules 300 to rotate together with the first electrode 11, and the second electrode 21 may transmit for example microwaves that are high-frequency signals by cooperating with the ground electrode 22, thereby simplifying the structure of the phase shifter.

In an embodiment, each metal patch 110 is a strip, and a respective longitudinal axis direction of each metal patch 110 is perpendicular to the respective longitudinal axis direction of the microstrip (i.e., the second electrode 21), as shown in FIG. 3.

In an embodiment, a width w of each metal patch 110 is 0.5 mm to 1.5 mm, and a length l of each metal patch 110 is less than or equal to 5 times of a width (i.e., a size in the horizontal direction in FIG. 3) of the microstrip.

As described above, the first electrode 11 includes the plurality of metal patches 110, and the plurality of metal patches 110 are arranged with a same interval therebetween, as shown in FIG. 3. Therefore, the first electrode 11 has a periodic structure, and one of the metal patches 110 and one of the intervals adjacent to the one metal patch 110 form one period b of the first electrode 11, as shown in FIG. 3. For example, the period b of the first electrode is less than or equal to 3 mm.

In an embodiment, the ground electrode 22 is grounded and is in the form of a sheet. As described above, the ground electrode 22 and the second electrode 21 may transmit a high frequency signal.

In an embodiment, the ground electrode 22 covers the entire surface of the second substrate 20 distal to the first substrate 10. However, the present disclosure is not limited thereto. For example, the ground electrode 22 and the second electrode 21 may at least partially overlap each other in a direction perpendicular to the second substrate 20.

In an embodiment, a length of the microstrip (i.e., a size in the vertical direction in FIG. 3) is equal to a length or a width of the second substrate 20. If the respective longitudinal axis of the microstrip is parallel to a long side of the second substrate 20, the length of the microstrip is equal to the length of the second substrate 20. If the respective longitudinal axis of the microstrip is parallel to a short side of the second substrate 20, the length of the microstrip is equal to the width of the second substrate 20.

In an embodiment, the dielectric layer 30 has a thickness a of 5 microns to 10 microns, as show in FIG. 2. The thickness of the dielectric layer 30 provided in the present embodiment of the present disclosure is small, such that the liquid crystal molecules of the dielectric layer 30 may be ensured to rotate rapidly, and thus the response speed of the phase shifter is improved. However, the present disclosure is not limited thereto. For example, the thickness of the dielectric layer 30 in an embodiment of the present disclosure may be set according to actual process conditions and product requirements.

In an embodiment, the liquid crystal molecules 300 (FIG. 1) are nematic liquid crystal molecules. The nematic liquid crystal molecules have advantages of larger dielectric constant anisotropy, small microwave absorption loss, and high rotation speed under a same electric field, and may further improve the performance of the phase shifter. As described above, an angle between a respective longitudinal axis direction of each of the nematic liquid crystal molecules and the plane where the second electrode 21 (FIG. 1) is located may be greater than 0 degree and less than 90 degree. In a case where the nematic liquid crystal molecules are positive nematic liquid crystal molecules, the angle between the respective longitudinal axis direction of each of the positive nematic liquid crystal molecules and the plane where the second electrode 21 is located may be greater than 0 degree and equal to or less than 45 degrees. In the case where the nematic liquid crystal molecules are negative nematic liquid crystal molecules, the angle between the respective longitudinal axis direction of each of the negative nematic liquid crystal molecules and the plane where the second electrode 21 is located may be greater than 45 degrees and less than 90 degrees.

Figure 4:
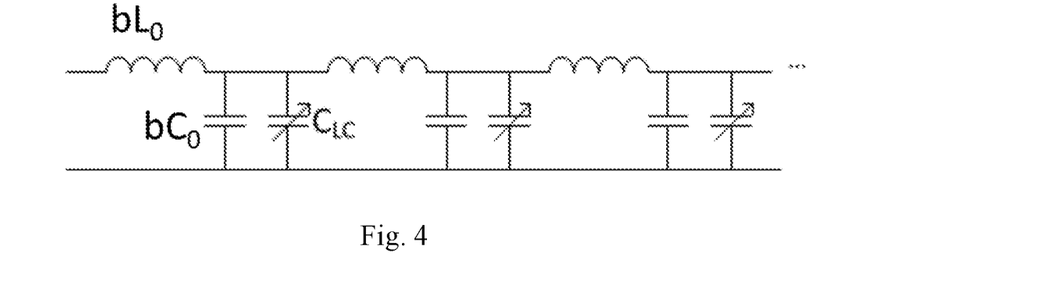
FIG. 4 is an equivalent circuit diagram of a phase shifter according to an embodiment of the present disclosure.

FIG. 4 is an equivalent circuit diagram of a phase shifter according to an embodiment of the present disclosure. As shown in FIG. 4, $L_0$ and $C_0$ are respectively an equivalent inductance value and an equivalent capacitance value of the microstrip (i.e., the second electrode 21 as shown in FIG. 3), b (FIG. 3) is the period of the first electrode 11 (FIG. 3), and $C_{LC}$ is a variable (because the dielectric constant of the dielectric layer 30 (FIG. 2) between each metal patch 110 (FIG. 3) and the second electrode 21 may vary with a variation of the electric field between the metal patch 110 and the second electrode 21) capacitance generated between each metal patch 110 and the second electrode 21.

For example, a phase velocity Vp of a microwave may be calculated according to the following formula:

$$V_p = \frac{1}{\sqrt{bL_0(bC_0 + C_{LC})}}$$

As can be seen from the above formula, the phase velocity $V_P$ is determined by the inductance $L_0$ and the capacitances $C_0$ and $C_{LC}$, while the inductance $L_0$ and the capacitances $C_0$ and $C_{LC}$ are determined by the size of the microstrip, the size of each metal patch 110, and the dielectric layer 30.

As can be seen from a formula for the parallel plate capacitor, the variable capacitance $C_{LC}$ generated between each metal patch 110 and the second electrode 21 is:

$$C_{LC} = \frac{\varepsilon_0 \varepsilon_r s}{d}$$

Where, $\varepsilon_0$ is a vacuum dielectric constant, $\varepsilon_r$ is a relative dielectric constant of the liquid crystal molecules 300, s is an overlapping area of each metal patch 110 and the microstrip (i.e., the second electrode 21), and d is a distance between the metal patch 110 and the microstrip.

As can be seen from the formula of the variable capacitance $C_{LC}$, the variable capacitance $C_{LC}$ generated between each metal patch 110 and the second electrode 21 is proportional to $\varepsilon_r$ and s (i.e., the larger $\varepsilon_r$ and s are, the larger $C_{LC}$ is), and inversely proportional to d (larger d results in smaller $C_{LC}$). Thus, in a case that the parameters b, $L_0$, and $C_0$ are given, the phase velocity $V_P$ is determined by $C_{LC}$. In addition, in a case where the parameters s and d are given, the phase velocity $V_P$ is determined by the relative dielectric constant $\varepsilon_r$ of the liquid crystal molecules 300.

In the present embodiment of the present disclosure, the value of the relative dielectric constant $\varepsilon_r$ of the liquid crystal molecules 300 (FIG. 1) is changed by applying an external driving voltage across the microstrip and the plurality of metal patches 110 (FIG. 3), to change the capacitance $C_{LC}$ between each metal patch 110 and the microstrip, and further to change the phase velocity $V_P$, thereby achieving the shifting phase of the microwave (i.e., changing the phase of the microwave).

In an embodiment, the phase shifter may further include: a driving circuit 40 (shown in FIG. 5), a first signal line 43 coupled to the first electrode 11, and a second signal line 44 coupled to the second electrode 21, in addition to the first substrate 10, the second substrate 20, the ground electrode 22, and the dielectric layer 30 that have been described above. In addition, the driving circuit may further include a first voltage signal output terminal 41 outputting a first voltage signal and a second voltage signal output terminal 42 outputting a second voltage signal. The first signal line 43 is coupled to the first voltage signal output terminal 41 of the driving circuit 40, and the second signal line 44 is coupled to the second voltage signal output terminal 42 of the driving circuit 40.

When the phase shifter is to operate, the driving circuit 40 outputs the first voltage signal to the first signal line 43 and outputs the second voltage signal to the second signal line 44. The first signal line 43 transmits the first voltage signal to the first electrode 11, and the second signal line 44 transmits the second voltage signal to the second electrode 21. An electric field is generated between the first electrode 11 and the second electrode 21 (e.g., the electric field is shown as a plurality of arrows in FIG. 5), and drives the liquid crystal molecules 300 to rotate. For example, the first voltage signal is different from the second voltage signal, such that there is a voltage difference between the first electrode 11 and the second electrode 21.

Figure 5:
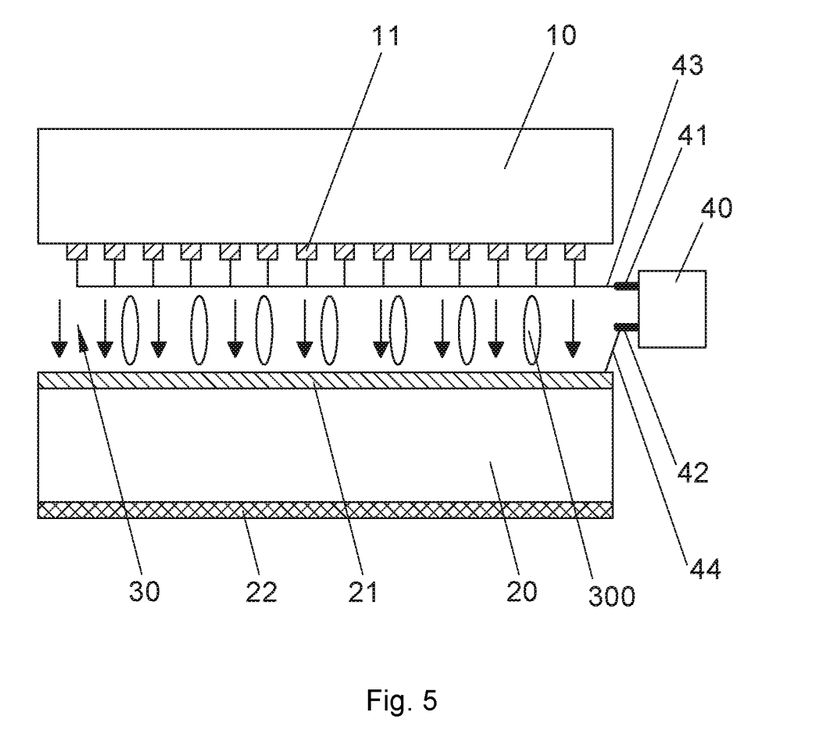
FIG. 5 is a schematic diagram of a phase shifter and an operation principle of the phase shifter according to an embodiment of the present disclosure.

FIG. 5 is a schematic diagram of a phase shifter and an operating principle of the phase shifter according to an embodiment of the present disclosure. The operating principle of the phase shifter is further described below with reference to FIG. 5.

The driving circuit 40 may output the first voltage signal to the first signal line 43 via the first voltage signal output terminal 41, and output the second voltage signal to the second signal line 44 via the second voltage signal output terminal 42. The first voltage signal is transmitted to the first electrode 11 (i.e., the plurality of metal patches 110 as shown in FIG. 3) via the first signal line 43, and the second signal is transmitted to the second electrode 21 via the second signal line 44. An electric field is generated between the first electrode 11 and the second electrode 21, and the electric field drives the liquid crystal molecules 300 to rotate, such that the respective longitudinal axes of the liquid crystal molecules 300 (shown as a plurality of ellipses in FIG. 5) are parallel or substantially parallel to the direction (shown as the plurality of arrows in FIG. 5) of the electric field between the first electrode 11 and the second electrode 21. Accordingly, the dielectric constant of the dielectric layer 30 is changed to cause a change in the phase velocity $V_P$ of a microwave, thereby achieving phase shifting of the microwave. Further, the second electrode 21 and the ground electrode 22 are configured to transmit outwards the phase-shifted microwave.

As described above, since the phase shifter provided by the embodiments of the present disclosure includes components such as a liquid crystal layer and the microstrip, and the phases of microwaves are adjusted by using the change of the dielectric constant of the liquid crystal layer with the change of the electric field, the phase shifter may be referred to as a liquid crystal phase shifter, or a liquid crystal microstrip phase shifter, or the like.

Furthermore, the inventors of the present disclosure also simulate the performance of the phase shifter provided by the embodiments of the present disclosure by using, for example, 3D Electromagnetic (EM) field Simulation tools of the Computer Simulation Technology (CST) corporation from Germany. Simulation results show that the phase shifter has a larger phase shift angle in a frequency range of 2 GHz to 30 GHz, and phase shifting efficiency may reach 80 degrees/dB (i.e., a phase change amount per unit insertion loss).

A method for operating the phase shifter is also provided in the embodiments of the present disclosure, and the method may be applied to the phase shifter provided in any one of the above embodiments of the present disclosure. For example, the method may include the following steps: applying different voltages to the first electrode 11 and the second electrode 21, respectively, to generate an electric field between the first electrode 11 and the second electrode 21, such that the respective longitudinal axes of the liquid crystal molecules 300 is parallel or substantially parallel to the direction of the electric field.

It should be noted that the different electric signals may be applied to both the first electrode 11 and the second electrode 21. Alternatively, an electric signal may be applied to one of the first electrode 11 and the second electrode 21, while no electric signal is applied to the other of the first electrode 11 and the second electrode 21.

When the phase shifter is to operate, the driving circuit 40 applies different electrical signals to the first electrode 11 and the second electrode 21, respectively, such that an electric field is generated between the first electrode 11 and the second electrode 21. The electric field drives the liquid crystal molecules 300 to rotate, such that the respective longitudinal axes of the liquid crystal molecules 300 are parallel or substantially parallel to the direction of the electric field between the first electrode 11 and the second electrode 21. Accordingly, the dielectric constant of the dielectric layer 30 is changed, thereby achieving phase shifting of a microwave.

The method for operating a phase shifter provided by the embodiments of the present disclosure may change the transmission parameters of microwaves, thereby achieving phase shifting. The operating method provided by the embodiments of the present disclosure reduces the loss, the response time, and the like of the phase shifter, and thus improves the performance of the phase shifter.

An antenna is provided by an embodiment of the present disclosure, and includes at least one phase shifter.

For example, the at least one phase shifter is the phase shifter provided by any one of the embodiments of FIGS. 1 to 5 of the present disclosure. The implementation principle and technical effects of the antenna are similar to those of the phase shifter described above, and will not be described in detail herein.

As described above, since the phase shifter included in the antenna includes a liquid crystal layer, the antenna may be referred to as a liquid crystal antenna. In practical applications, the antenna may further include a carrier element, such as a carrier plate, and the phase shifter may be disposed on the carrier plate. However, the embodiments of the present disclosure are not limited thereto.

It should be noted that the number of the phase shifters included in the antenna may be determined according to actual requirements, and the embodiment of the present disclosure is not particularly limited.

A communication device is provided by an embodiment of the present disclosure, and includes an antenna.

For example, the antenna is the antenna provided by any one of the above-described embodiments of the present disclosure. The implementation principle and technical effects of the communication device are similar to those of the phase shifter described above, and will not be described in detail herein. In practical applications, the communication device may further include components known in the art, such as a display, a touch panel, and/or the like.

For example, the communication device may be a smartphone, a tablet computer, a smart computer, or the like.

The drawings of the present disclosure are only schematic representations of structures to which the present inventive concepts relate, and other structures may be referred to conventional design in the art.

It is to be understood that the thickness and dimensions of layers or microstructures may be exaggerated in the figures used to describe embodiments of the present disclosure for clarity. In addition, when an element such as a layer, film, region, or substrate is referred to as being "on" or "under" another element, it can be "directly on" or "directly under" the other element, or intervening elements may be present.

Features in various embodiments of the present disclosure may be combined with each other to arrive at new embodiments in a case that there is no explicit conflict.

Although the foregoing exemplary embodiments of the present disclosure have been described, the descriptions are merely illustrative of implementations that can be adopted for understanding of the principles of the present disclosure, and are not intended to limit the present disclosure. It will be apparent to one of ordinary skill in the art that, various changes and modifications can be made to the described embodiments in form and details without departing from the spirit and scope of the present disclosure, and these changes and modifications also fall within the scope of the present disclosure as defined by the appended claims.

What is claimed is:

1. A phase shifter, comprising:
   a first substrate and a second substrate opposite to each other;
   a dielectric layer between the first substrate and the second substrate;
   a first electrode on a side of the first substrate proximal to the second substrate;
   a second electrode on a side of the second substrate proximal to the first substrate; and
   a ground electrode on a side of the second substrate distal to the first substrate;
   wherein the dielectric layer comprises liquid crystal molecules, and the first electrode and the second electrode are configured to control rotation of the liquid crystal molecules according to different voltages respectively received by the first electrode and the second electrode, and
   wherein a dielectric constant of each of the liquid crystal molecules in a respective longitudinal axis direction of the liquid crystal molecule is larger than a dielectric constant of the first substrate of the second substrate.

2. The phase shifter according to claim 1, wherein the first electrode comprises a plurality of metal patches arranged periodically.

3. The phase shifter according to claim 2, wherein the second electrode is a microstrip.

4. The phase shifter according to claim 3, wherein a respective longitudinal axis direction of the microstrip is the same as a direction in which the plurality of metal patches are arranged.

5. The phase shifter according to claim 3, wherein a respective length of each of the plurality of metal patches is less than or equal to 5 times of a width of the microstrip.

6. The phase shifter according to claim 2, wherein each of the plurality of metal patches has a width of 0.5 millimeters to 1.5 millimeters.

7. The phase shifter according to claim 2, wherein a period of the first electrode is less than or equal to 3 millimeters.

8. A method for operating the phase shifter according to claim 1, the method comprising:
   applying the different voltages to be respectively received by the first electrode and the second electrode, respectively, to generate an electric field between the first electrode and the second electrode, so as to cause a respective longitudinal axis of the liquid crystal molecules to be substantially parallel to a direction of the electric field.

9. The phase shifter according to claim 1, wherein the dielectric layer has a thickness of 5 microns to 10 microns.

10. The phase shifter according to claim 1, wherein the ground electrode is grounded and has a sheet shape.

11. The phase shifter according to claim 1, wherein a material of any one of the first substrate and the second substrate comprises glass, sapphire, polyethylene terephthalate, triallyl cyanurate, polyimide, or ceramic.

12. The phase shifter according to claim 1, wherein a material of the second electrode comprises aluminum, silver, gold, chromium, molybdenum, nickel, iron, or transparent conductive oxide.

13. The phase shifter according to claim 1, wherein a material of the first electrode comprises aluminum, silver, gold, chromium, molybdenum, nickel, or iron.

14. A phase shifter, comprising:
   a first substrate and a second substrate opposite to each other;
   a dielectric layer between the first substrate and the second substrate;
   a first electrode on a side of the first substrate proximal to the second substrate;
   a second electrode on a side of the second substrata proximal to the first substrate; and
   a ground electrode on a side of the second substrate distal to the first substrate;
   wherein the dielectric layer comprises liquid crystal molecules, and the first electrode and the second electrode are configured to control rotation of the liquid crystal molecules according to different voltages respectively received by the first electrode and the second electrode, and
   wherein the dielectric layer has a thickness of 5 microns to 10 microns.

15. A phase shifter, comprising:
   a first substrate and a second substrate opposite to each other;
   a dielectric layer between the first substrate and the second substrate;
   a first electrode on a side of the first substrate proximal to the second substrate;
   a second electrode on a side of the second substrate proximal to the first substrate; and
   a ground electrode on a side of the second substrate distal to the first substrate;
   wherein the dielectric layer comprises liquid crystal molecules, and the first electrode and the second electrode are configured to control rotation of the liquid crystal molecules according to different voltages respectively received by the first electrode and the second electrode, and
   wherein the liquid crystal molecules are nematic liquid crystal molecules.

16. The phase shifter according to claim 15, wherein the dielectric layer has a thickness of 5 microns to 10 microns.

17. The phase shifter according to claim 15, wherein a dielectric constant of each of the liquid crystal molecules in a respective longitudinal axis direction of the liquid crystal molecule is larger than a dielectric constant of the first substrate or the second substrate.

18. The phase shifter according to claim 15, wherein an angle between a respective longitudinal axis direction of each of the nematic liquid crystal molecules and a plane where the second electrode is located is greater than 0 degree and less than 90 degrees.

19. The phase shifter according to claim 18, wherein the nematic liquid crystal molecules are negative nematic liquid crystal molecules, and the angle between a respective longitudinal axis direction of each of the negative nematic liquid crystal molecules and the plane where the second electrode is located is greater than 45 degrees and less than 90 degrees.

20. The phase shifter according to claim 18, wherein the nematic liquid crystal molecules are positive nematic liquid crystal molecules, and the angle between a respective longitudinal axis direction of each of the positive nematic liquid crystal molecules and the plane where the second electrode is located is greater than 0 degree and less than or equal to 45 degrees.

* * * * *